US009619483B1

(12) United States Patent
Robinson et al.

(10) Patent No.: US 9,619,483 B1
(45) Date of Patent: Apr. 11, 2017

(54) RANKING DISCUSSION FORUM THREADS

(75) Inventors: James G. Robinson, Olympia, WA (US); Samuel S. Sonne, Seattle, WA (US); Jacob G. Kalberer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/072,464

(22) Filed: Mar. 25, 2011

(51) Int. Cl.
  G06F 7/00 (2006.01)
  G06F 17/30 (2006.01)
(52) U.S. Cl.
  CPC ............... *G06F 17/30206* (2013.01)
(58) Field of Classification Search
  None
  See application file for complete search history.

(56) References Cited

U.S. PATENT DOCUMENTS

| 7,197,470 | B1 * | 3/2007 | Arnett .................. G06F 21/31 705/7.29 |
| 7,711,779 | B2 | 5/2010 | Goodman et al. |
| 7,778,926 | B1 * | 8/2010 | Grinchenko ........ G06F 21/6218 705/50 |
| 7,904,510 | B2 | 3/2011 | Anderson et al. |
| 7,930,347 | B2 | 4/2011 | Maxwell et al. |
| 8,494,992 | B1 * | 7/2013 | Westbrook ................. 706/45 |
| 2004/0172405 | A1 * | 9/2004 | Farran ..................... 707/100 |
| 2004/0210550 | A1 * | 10/2004 | Williams et al. ............. 707/1 |
| 2005/0038717 | A1 * | 2/2005 | McQueen, III ........ G06Q 30/02 705/26.61 |
| 2005/0159969 | A1 * | 7/2005 | Sheppard ................... 705/1 |
| 2005/0198128 | A1 * | 9/2005 | Anderson ............... G06F 17/24 709/204 |
| 2006/0026593 | A1 * | 2/2006 | Canning et al. ............. 718/100 |
| 2006/0036685 | A1 * | 2/2006 | Canning et al. ............. 709/204 |
| 2006/0112392 | A1 * | 5/2006 | Zhang et al. ................. 718/102 |
| 2007/0288962 | A1 | 12/2007 | Carlson et al. |
| 2008/0126319 | A1 * | 5/2008 | Bukai et al. .................... 707/3 |
| 2008/0126954 | A1 * | 5/2008 | Schmidt ........................ 715/758 |
| 2008/0222100 | A1 * | 9/2008 | Chiu .................. G06F 17/3064 |
| 2009/0144272 | A1 * | 6/2009 | Adarsh et al. .................. 707/5 |
| 2009/0204465 | A1 * | 8/2009 | Pradhan ................. G06Q 10/06 705/7.17 |
| 2010/0070503 | A1 * | 3/2010 | Abraham ............... G06Q 30/00 707/737 |
| 2010/0121857 | A1 * | 5/2010 | Elmore ............. G06F 17/30702 707/748 |
| 2010/0205168 | A1 * | 8/2010 | Yang et al. .................... 707/709 |

(Continued)

OTHER PUBLICATIONS

Office action for U.S. Appl. No. 13/072,400, mailed on Oct. 5, 2012, Robinson et al., "Ranking Discussion Forum Threads", 25 pages.
(Continued)

*Primary Examiner* — Debbie Le
*Assistant Examiner* — Hasanul Mobin
(74) *Attorney, Agent, or Firm* — Lee & Hayes, PLLC

(57) ABSTRACT

Discussion threads may be ranked based a factor other than a time since a most recent post of the discussion thread. For example, discussion threads may be ranked based on a likelihood of each discussion thread being helpful to a broad range of users and/or based on how likely each discussion thread is to draw users to participate in the respective discussion thread.

26 Claims, 9 Drawing Sheets

(56) References Cited

U.S. PATENT DOCUMENTS

2010/0257186 A1* 10/2010 Dewar .............. G06F 17/30675
707/749
2010/0299326 A1   11/2010 Germaise
2011/0041082 A1*  2/2011 Nguyen ................ G06Q 10/10
715/752
2012/0197871 A1*  8/2012 Mandel et al. ............... 707/722

OTHER PUBLICATIONS

Office action for U.S. Appl. No. 13/072,400, mailed on Jul. 15, 2013, Robinson et al., "Ranking Discussion Forum Threads", 26 pages.

Zhang, et al., "An Approach for Predicting and Ranking Consumer Review Helpfulness", Proceedings of the IADIS International Conference on e-Commerce, Jul. 2008, pp. 128-135.

"How Reddit ranking algorithms work," retrieved from http://web.archive.org/web/20110308114104/http://amix.dk/blog/post/19588 on Dec. 26, 2013; available as early as Mar. 8, 2011, 5 pages.

Munroe, "reddit's new comment sorting system," retrieved on Apr. 16, 2014 at <<http://www.redditblog.com/2009/10/reddits-new-comment-sorting-system.html>>, BLOG.reddit, Oct. 15, 2009, 6 pgs.

Tsur, et al., "REVRANK: a Fully Unsupervised Algorithm for Selecting the Most Helpful Book Reviews," Third International AAAI Conference on Weblogs and Social Media (ICWSM 2009), May 17-20, 2009, 8 pgs.

Final Office Action for U.S. Appl. No. 13/072,400, mailed on Nov. 14, 2014, James G. Robinson, "Ranking Discussion Forum Threads", 25 pages.

* cited by examiner

200

Discussion Board http://www.site.com/forum123

Discussion Forum

| Home   Product (12,012)   Discussions (1,450)   Contributors (20,987) .... | | |
|---|---|---|
| Discussion | Replies | Latest Post |
| I like ABC game console | 234 | 2 hours ago |
| XYZ console is better | 12 | 10 min ago |
| Don't buy ABC game console! | 100 | 7 days ago |
| Help! My ABC game console is broken! | 250 | 15 days ago |
| See all discussions ...   [Start a new thread] | | |

118
118(O)

XYZ console is better   118(O)   Subscribers (52)   202

132(1)

*Newbie* said:                                                                                January 1, 2011, at 11:25pm PST Which is better the ABC game console or the XYZ console?                    134(1)

Post a reply          Did you find this post helpful?    0 👍  0 👎

132(2)

*Die Hard Gamer* said:                                                                        January 2, 2011, at 3:37pm PST The XYZ game console is easier to play and a lot of games have been developed for XYZ game console. Since ABC game console is pretty new, only a few game developers have developed games for this console and therefore you probably need to wait some time before you could find enough games to keep you entertained. ☺                134(2)

Post a reply          Did you find this post helpful?    16 👍  2 👎  = 89%

132(3)

*Crazy Gamer* said:                                                                            January 6, 2011, at 10:14am PST Hey, I just bought ABC game console. The ABC game console is decent, including a lot of new functions. However, I think XYZ game console is still better than ABC game console. By the way, Die Hard Gamer, thanks for the comment, that was very helpful.
                                                                                                                    134(3)

Post a reply          Did you find this post helpful?    1 👍  0 👎  = 100%

+ See More Posts              204

XYZ console is better　　　　　　　　　　　　Subscribers (52)

*Newbie* said:　　　　　　　　　　　　　　　　January 1, 2011, at 11:25pm PST

Which is better the ABC game console or the XYZ console?

Post a reply　　　　Did you find this post helpful?　　0 👍 0 👎

---

*Die Hard Gamer* said:　　　　　　　　　　　　January 2, 2011, at 3:37pm PST

The XYZ game console is easier to play and a lot of games have been developed for XYZ game console. Since ABC game console is pretty new, only a few game developers have developed games for this console and therefore you probably need to wait some time before you could find enough games to keep you entertained. ☺

Post a reply　　　　Did you find this post helpful?　　16 👍 2 👎 = 89%

---

*Crazy Gamer* said:　　　　　　　　　　　　　January 6, 2011, at 10:14am PST

Hey, I just bought ABC game console. The ABC game console is decent, including a lot of new functions. However, I think XYZ game console is still better than ABC game console. By the way, Die Hard Gamer, thanks for the comment, that was very helpful.

Post a reply　　　　Did you find this post helpful?　　1 👍 0 👎 = 100%

+See More Posts

302 →　　　　　　　　　　　　304 →　　306 →　　308 →

Similar posts that have been found helpful/sticky

| Thread Title | Similarity | Helpful | Sticky |
|---|---|---|---|
| ABC game console vs XYZ game console | .86 | .75 | .71 |
| Better your game on ABC game console | .77 | .51 | .43 |
| ABC game console with two games free | .50 | .44 | .62 |

310 →　　　　　　　　　　　　　　312 →　　314 →

Similar posts that have received positive votes

| Thread Title | Similarity | Positive Votes |
|---|---|---|
| ABC game console vs XYZ game console | .86 | .72 |
| Don't buy ABC game console! | .55 | .91 |
| What new functions does ABC game console have? | .49 | .89 |

Discussion Board

⬅ ➡ ✖ 🔄 🏠 🔍 Search ⭐ http://www.site.com/forum123

Discussion Forum

| Home  Product (12,012)  Discussions (1,450)  Contributors (20,987) .... |||
| --- | --- | --- |
| Discussion | Replies | Latest Post |
| I like ABC game console | 234 | 2 hours ago |
| *XYZ console is better* | *12* | *10 min ago* |
| Don't buy ABC game console! | 100 | 7 days ago |
| Help! My ABC game console is broken! | 250 | 15 days ago |
| See all discussions ... | Start a new thread ||

118(O) ⟶

402 ⟶ Related Hot Topics

Recent Chirps from Micro-Blogging Site Flutter

January 6, 2011, at 7:45pm PST
Ben Franklyn chirped:
Have you tried the new controller for the ABC game console. All I can say is AWESOME!!!

January 6, 2011, at 8:11pm PST
Tom Jefferson chirped:
ABC's new controller has more buttons than my calculator.

404 ⟶

Recent Articles from Gamer News

January 3, 2011

A Steady Stream of New Games
New Games Expected out for ABC console by midyear, with more to come just before the holiday rush. Can't wait that long? Be sure to try ....

406 ⟶

Recent Posts to RSS Feeds

*GAMERSS* - January 4, 2011
Look out XYZ, the ABC console is here to stay. With a faster processor, more memory, and built in wireless connectivity, this console promises to be a game changer. Read more ...

Discussion Board

⬅ ➡ ✖ ⟳ 🏠 🔍 Search ⭐ http://www.site.com/forum123

Discussion Forum

| Home   Product (12,012)   Discussions (1,450)   Contributors (20,987) .... | | |
|---|---|---|
| Discussion | Replies | Latest Post |
| I like ABC game console | 234 | 2 hours ago |
| *XYZ console is better* | *12* | *10 min ago* |
| The XYZ game console is easier to play and a lot of games have been developed for XYZ game console. Since ABC game console is pretty new, only a few game developers have developed games ... Read rest of post | | |
| Don't buy ABC game console! | 100 | 7 days ago |
| Help! My ABC game console is broken! | 250 | 15 days ago |
| See all discussions ...  [ Start a new thread ] | | |

118(O)

132

*Newbie* said:                                    January 1, 2011, at 11:25pm PST Which is better the ABC game console or the XYZ console?

Post a reply          Did you find this post helpful?     0 👍  0 👎

---

*Die Hard Gamer* said:                             January 2, 2011, at 3:37pm PST The XYZ game console is easier to play and a lot of games have been developed for XYZ game console. Since ABC game console is pretty new, only a few game developers have developed games for this console and therefore you probably need to wait some time before you could find enough games to keep you entertained. ☺

Post a reply          Did you find this post helpful?    ( 16 👍  2 👎 = 89% )

---

*Crazy Gamer* said:                                January 6, 2011, at 10:14am PST Hey, I just bought ABC game console. The ABC game console is decent, including a lot of new functions. However, I think XYZ game console is still better than ABC game console. By the way, Die Hard Gamer, thanks for the comment, that was very helpful.

Post a reply          Did you find this post helpful?    1 👍  0 👎 = 100%

Fig. 8

RANKING DISCUSSION FORUM THREADS

BACKGROUND

Companies utilizing network-accessible sites (e.g., websites, intranets, etc.) continually strive to make their sites more dynamic, compelling, and easier for users to use. For instance, e-commerce websites may strive to make it easier for customers to locate, learn about, and purchase or otherwise acquire items. To help achieve this and other goals, these companies typically allow users to participate in discussion forums. Discussion forums allow customers and enthusiasts to engage in discussions about items. For example, a discussion forum about a particular item may include discussion threads relating to the merits of the particular item, or how the item compares to another item. These discussion forums may be helpful to other customers who are considering acquiring an item described in one or more threads of the discussion forum. However, as a number of discussion threads in a discussion forum grows, customers may overlook pertinent discussion threads. In addition to providing a platform for such discussion forums, these companies continue to seek ways to improve customer experiences.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical items.

FIG. 2 is a screen rendering of an example user interface (UI) that includes a discussion forum. As illustrated, the discussion forum includes multiple discussion threads, one of which is shown to include multiple posts. The discussion threads are ranked based on a factor other than a time since a last post of the discussion threads.

FIG. 3 is a screen rendering of another example of a UI, which illustrates ranking discussion threads based on a comparison of text of a series of posts of a discussion thread with text of posts of other threads that have been found to be helpful/sticky and/or have received a high percentage of positive votes.

FIG. 4 is a screen rendering of another example UI, which illustrates ranking discussion threads based on their relation to one or more topics of current interest or "Hot Topics."

FIG. 8 is a screen rendering of another example UI, which illustrates determination and presentation of a title and a most relevant post of a discussion thread in a discussion forum.

DETAILED DESCRIPTION

Figure 1:
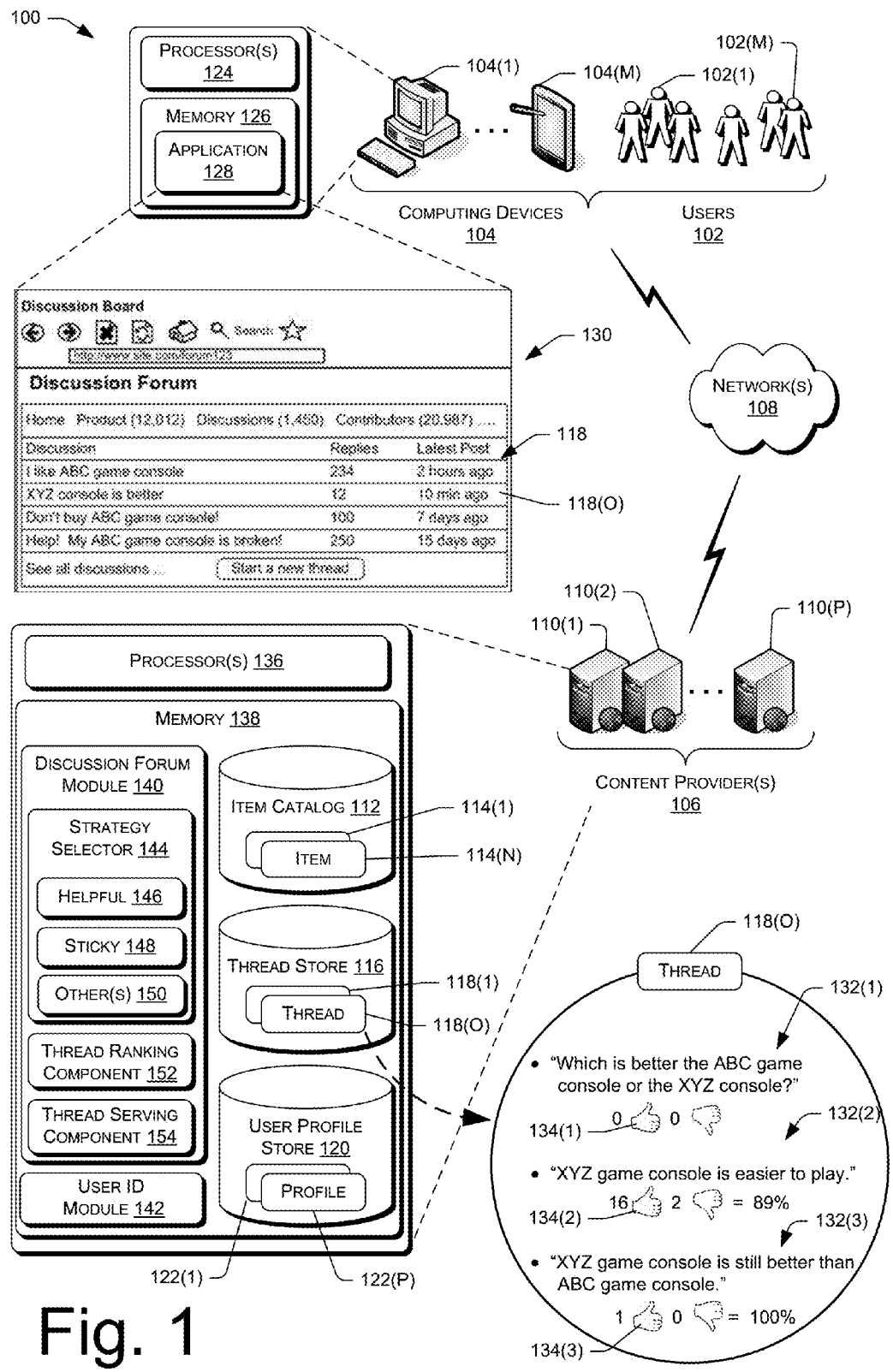
FIG. 1 is a schematic diagram of an example architecture for enabling presentation of discussion forums. In this example, users are able to engage in discussion forums pertaining to items from an item catalog.

As discussed above, discussion forums may be helpful to customers who are considering acquiring an item described in one or more threads of the discussion forum. However, existing discussion forums typically present discussion threads (or "threads") based on a recency of a last post in the thread. That is, a thread with a most recent post will be presented first in the discussion forum, regardless of the information contained in the post. This may result in threads of marginal informational value being presented higher in a list than informative threads. Consequently, customers have to sort through a large number of marginal-value discussion threads to locate the informative discussion threads.

This disclosure describes ordering discussion threads in a discussion forum based on a factor, other than a time since a last post in the discussion threads. Discussion threads may be ranked and presented in an order based on a variety of different ranking strategies. In one example, discussion threads may be ranked and presented based on their relevance to one or more users. Discussion threads may be determined to be relevant if, for example, they are likely to be helpful to a customer (referred to herein as "helpfulness" of a thread) and/or are likely to enticing users to participate in the discussion (referred to herein as "stickiness" of a thread). These and other ranking strategies may be used to surface relevant discussion threads in discussion forums. In this way, pertinent discussion threads are presented to users without the user having to sort through discussion threads that are less pertinent but happen to have had a more recent post.

Different ranking strategies may be employed in different circumstances. In one example, different rankings strategies may be chosen for different discussion forums (e.g., a helpfulness ranking strategy may be employed for a frequently asked questions discussion forum, while a stickiness ranking strategy may be employed for a new product discussion forum). In another example, multiple discussion forums may be presented on a same page and different ranking strategies may be employed for each of the multiple discussion forums (e.g., a helpful forum with threads ordered based on their helpfulness presented along with a sticky forum with threads ordered based on their stickiness). In still another example, multiple different ranking strategies may be employed to rank threads of a single discussion forum. In that case, threads may be ordered based on a weighted average of their helpfulness and stickiness (with helpfulness and stickiness being weighted equally or differently) or in an alternating fashion (e.g., most helpful thread, followed by stickiest, followed by second most helpful thread, followed by second stickiest thread, and so forth).

Different raking strategies may additionally or alternatively be employed for different users and/or different user roles. For example, consumers may be presented with discussion threads organized based on a helpfulness ranking strategy, while enthusiasts may be presented with discussion threads organized based on a stickiness rankings strategy. That way, the threads listed first for a consumer will be those threads that include information useful in making a buying decision (e.g., descriptions of an item, comparisons of the item to other items, critiques of the item, etc.). In contrast the threads listed first for an enthusiast will be those threads that are likely to engage the enthusiast in discussion (e.g., debates of the merits of an item or technology, discussions of controversial topics, previews of new technology, etc.). User identity may be determined by the user logging into a site associated with the discussion forum. The type of ranking strategy to use may be determined by, for example, explicit or implicit user preferences (e.g., explicit settings and/or implied settings based on other explicit settings), a history of the user's interaction with the site (e.g., purchase history, previous posts to discussion threads, etc.), a user's interaction the site during a current session (e.g., viewing item detail pages, purchasing other items, etc.).

In some examples, the actual ranking of discussion threads (as distinguished from selection of the ranking strategy) may be performed for an individual user (i.e., user-specific rankings). However, in other examples, the ranking of discussion threads may be performed for a broad class of users. The actual ranking of discussion threads may be performed according to either of these examples, regardless of the ranking strategy employed. For example, a sticky ranking strategy could be chosen based on identification of the user as an enthusiast, while the discussion threads themselves could be ranked according to the sticky ranking strategy based on a likelihood of enticing a broad class of users (as opposed to just the identified user) to participate in the threads.

The techniques described herein may allow users to participate in discussion forums regarding any topic. For ease of illustration, many of these techniques are described in the context of discussion forums associated with items available for purchase from an item catalog of a merchant, such as an e-commerce merchant. In this context, the merchant presents discussion forums at various locations on the merchant's site to facilitate user discussion of items available for purchase from the merchant's site, which helps users make informed buying decisions. By ranking discussion threads of the discussion forums as described herein, users are able to readily find the most pertinent discussion threads. However, the techniques described herein are not limited to use in the merchant store context and may apply to discussion forums in other context as well. For example, the techniques described herein may be used to rank discussion threads of discussion forums associated with social networking sites, blogging sites, bulletin board sites, customer review sites, and the like.

Example Architecture

FIG. 1 is a schematic diagram of an example architecture 100 that is usable to enable users 102(1), . . . , 102(M) (collectively 102) operating respective computing devices 104(1), . . . , 104(M) (collectively 104) to engage in discussion forums about topics such as, for example, items from an electronic catalog. As described above, however, these techniques apply to discussion forums in other contexts as well. Accordingly, the architecture 100 is merely one example, and the techniques described herein are not limited to performance using the architecture of FIG. 1.

Within the architecture 100, the users 102 may operate the computing devices 104 to access one or more content providers 106 via a network 108. While illustrated as a personal computer and a personal digital assistant (PDA), these computing devices 104 may be implemented as any number of other types of computing devices. These devices may include, for instance, PCs, laptop computers, PDAs, mobile phones, set-top boxes, game consoles, electronic book readers, and so forth. The network 108, meanwhile, represents any one or combination of multiple different types of wired and/or wireless networks, such as cable networks, the Internet, private intranets, and the like. Again, while FIG. 1 illustrates the devices 104 communicating with the content providers 106 over the network 108, the techniques may apply in any other networked or non-networked architectures.

One or more servers 110(1), 110(2) . . . , 110(P) (collectively 110), perhaps arranged in a cluster or as a server farm, may host the example content provider 106. Other server architectures may also be used to host the provider 106. In the illustrated implementation, the servers 110 are shown to include multiple modules and components, which may run as software on the web servers themselves. The illustrated modules may be stored in memory (e.g., volatile and/or nonvolatile memory, removable and/or non-removable media, and the like), which may be implemented in any method or technology for storage of information, such as computer-readable instructions, data structures, program modules, or other data. Such memory includes, but is not limited to, random access memory (RAM), read only memory (ROM), electrically-erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, redundant array of independent disks (RAID) storage systems, or any other medium which can be used to store the desired information and which can be accessed by a computing device. While FIG. 1 illustrates the servers 110 as containing the illustrated modules, these modules and their corresponding functionality may be spread amongst multiple other actors, each of whom may or may not be related to the content provider 106.

In some instances, the content provider 106 comprises a site (e.g., a website) that is capable of handling requests from many users and serving, in response, various pages (e.g., web pages) that can be rendered at the computing devices 104. For instance, the site can be any type of site that supports user interaction, including online retailers, informational sites, social networking sites, blog sites, search engine sites, news and entertainment sites, and so forth. In another example, the content provider 106 provides an application for the computing devices 104 to download, store, and run locally. The content provider 106 may additionally or alternatively interact with the devices 104 or provide content to the devices 104 in any other way.

In this example, the site of the content provider 106 represents a merchant website that hosts an item catalog 112 that stores one or more items 114(1), 114(2), . . . , 114(N) (collectively 114) and/or information regarding the items 114. An item includes anything that the merchant wishes to offer for purchase, rental, licensing, subscription, viewing, informative purposes, or some other form of consumption. In some embodiments, the item may be offered by the merchant for consumption. However, in some other embodiments, the merchant may host items that others are selling using the merchant's website. An item can include a product, a service, a digital download, a news clip, user-created content, information, or some other type of sellable or non-sellable unit.

While the item catalog 112 may store some items, the catalog 112 may additionally or alternatively store item records. Item records represent information regarding associated items being offered for sale or another form of consumption. For products such as books or music CDs, for example, the item record may contain a description, images of the product, author/artist names, publication data, pricing, shipping information, and so forth. For other types of items, the item record may contain different information appropriate for those items. Hereafter, the term "item" may be used interchangeably with the term "item record".

When a user requests information about an item from the content provider 106, the servers 110 retrieve the item information from the item catalog 112 and serve the information (e.g., via a web page) to the computing device of the requesting user. The item catalog 112 may therefore contain static pages that are pre-generated and stored prior to such requests, or may alternatively store data that is used to populate dynamic pages that are generated in response to such requests.

The servers 110 may further store, or have access to, a thread store 116 that includes one or more discussion threads (or simply "threads") 118(1), ..., 118(O) (collectively 118). Each thread 118 comprises one or more discussion posts (or simply "posts"). Moreover, each thread 118 belongs to or is to be presented in one or more discussion forums. For instance, threads 118 may include discussions of items within the item catalog 112. FIG. 1 illustrates, for example, that the example thread 118(O) comprises a particular discussion thread related to an "XYZ game console" and an "ABC game console" one or both of which may be available for purchase from the item catalog 112. In order to access some or all of the information available from the content provider 106, the user may be asked to create an account. A user profile store 120 stores user profiles 122(1), ... 122(P) (collectively 122) associated with user accounts. The user profiles 122 store user authentication information (e.g., user name and password), purchase history, payment information (e.g., credit card numbers, gift cards, etc.), shipping and/or billing address information, and the like.

In some instances, the users 102 may utilize the computing devices 104 to upload and/or access the information stored in the item catalog 112 and the thread store 116. In FIG. 1, for instance, the example user 102(1) may utilize the example computing device 104(1) to access a discussion forum, of which thread 118(O) is a part. For instance, the user 102(1) may request an item detail page associated with the ABC console and the discussion forum may be a part of the item detail page, may request a product category page (e.g., game consoles) and the discussion forum may be a part of the product category page, or may request a customer review page and may the discussion forum may be provided along with the customer review page. The discussion forum may be served to the user 102(1) alone or alone with any of the foregoing or other pieces information.

In the illustrated example, the computing device 104(1) comprises one or more processors 124 and memory 126, which stores an application 128 (e.g., a browser, etc.) that communicates with the content provider 106 over the network 108. Here, the user 102(1) requests, and the content provider 106 serves, a user interface (UI) 130 that includes the discussion forum including a plurality of discussion threads 118, ranked according to a factor other than a time at which a most recent post was received for each discussion thread. For instance, the discussion threads 118 may be ranked according to their relevance to a user based on, for example, their relative likelihood of helpful to a customer ("helpfulness") and/or are their likelihood of enticing users to participate in the discussion thread ("stickiness").

The bottom-right portion of FIG. 1 illustrates information associated with the discussion thread 118(O) in greater detail. As illustrated, the example discussion thread 118(O) comprises multiple posts, three of which, posts 132(1), 132(2), and 132(3) (collectively 132) are shown. In this example, FIG. 1 illustrates three posts 132 of thread 118(O), an original or first post 132(1) ("Which is better the ABC game console or the XYZ console"), a second post 130(2) ("XYZ console is easier to play"), and a third post 132(3) ("XYZ game console is still better than ABC game console"). The second and third posts 132(2) and 132(3) were posted in reply to the original post 132(1).

In addition to illustrating the example posts 132, FIG. 1 illustrates that each of the posts may be associated with respective statistics indicating approval or disapproval of the corresponding segments from the user community 102. In this example, the first post has statistics 134(1) indicating that no positive or negative feedback has been provided for the first post 132(1), the second post 132(2) is associated with statistics 134(2), which indicate that the post 132(1) has received sixteen positive votes (or "thumbs up") and two negative votes (or "thumbs down"). A positive vote may indicate that a voting user generally agreed with the post or thought that the post added value to the discussion thread, while a negative vote may indicate that a user generally disagreed with the post or found the post to add no real value to the discussion thread. In this example, the statistics 134(2) indicate that the second post 132(2) has received 89% positive votes (and/or has 11% negative votes), while post 132(3) has a 100% positive votes. As described in more detail below, the statistics 134, or more specifically the votes underlying the statistics, are one factor that may be used to rank discussion threads for presentation in a discussion forum.

To perform the functionality described immediately above, the content provider 106 includes one or more processors 136 and memory 138. The memory stores or otherwise has access to the item catalog 112, thread store 116, and user profile store 120. The memory 138 also stores one or more modules that are executable by the one or more processors 136 to implement various functionality. While FIG. 1 illustrates each of the modules being stored on or accessible by the content provider 106, in some instances some or all of these components may reside on one or more other entities. For instance, some or all of these components may reside on the computing devices 104 in some instances. Furthermore, in some instances, the components shown on the content provider 106 may provide code to the respective computing devices 104 to perform the respective functionality of the component.

In the illustrated example, the memory 138 stores a discussion forum module 140 to facilitate presentation of discussion forums to users, and a user ID module 142 to authenticate users to the content provider 106. The discussion forum module 140 includes a strategy selector 144 to select an appropriate thread ranking strategy to use to rank threads 118 for presentation in one or more discussion forums. In the illustrated example, the strategy selector 144 can choose from among available thread ranking strategies including a helpful strategy 146, in which threads are ranked based on their likelihood to be helpful to a broad range of customers, a sticky strategy 148, in which threads are ranked according to their likelihood of enticing users to participate in a discussion thread, or one or more other strategies 150. The selection of which strategy to employ may be based on, for example, a forum in which the thread is to be presented, a user that is presently viewing the forum, a product or category to which the forum pertains, or the like.

Each ranking strategy may rank the threads 118 based on one or more characteristics of the threads 118. Examples of characteristics that may be used to rank threads 118 of a discussion forum include, by way of example and not limitation, a number of unique participants in the respective discussion thread, a number of users that have subscribed to the respective discussion thread, a number of positive and/or negative votes associated with posts of the respective discussion thread, a frequency of posts to the respective discussion thread, whether the respective discussion thread relates to a topic of current interest at a media source (e.g., micro-blogging site, news site, really simple syndication feed, etc.), a number of times that posts of the respective discussion thread have been viewed, a number of times that posts of the respective discussion thread have been clicked-on, a behavior of users after viewing or clicking-through posts of the respective discussion threads, a number of users that have voted positively for posts of the respective discussion thread, an amount of time users spent viewing posts of the respective discussion thread, a reputation of a voter who has voted on a post of the respective discussion thread, a reputation of an author of a post of the respective discussion thread, explicit feedback from users regarding helpfulness of a post of the respective discussion thread (e.g., in a subsequent post), a comparison of text of the respective discussion thread to text of other discussion threads previously determined to elicit positive votes, and/or a comparison of text of the respective discussion thread to text of other discussion threads previously determined to be helpful.

Discussion threads 118 may be ranked based on any one or more of the foregoing, or other, characteristics. Furthermore, when more than one characteristic is used to rank discussion threads 118, the characteristics may be weighted evenly or unevenly and/or may be normalized to avoid outliers. Moreover, weights of one or more of these characteristics may be decayed over time so that old threads that have not received recent votes will not dominate discussion forums. The specific equations used to rank the discussion threads 118 may vary widely depending on the ranking strategy employed.

In one specific example corresponding to the helpfulness ranking strategy 146, discussion threads 118 may be ranked according to the following parameterized equation:

$$CQ=(K+\text{sum\_over\_}i(o\_i*w\_i))/(K+L+\text{sum\_over\_}i(w\_i)) \quad (1)$$

In the preceding equation, CQ represents the content quality which is an indication of a likelihood that a user will vote for a post of a particular thread and, in this example, indicates the likelihood that a particular thread will be helpful to a user. K and L represent unitless constants chosen to represent an average number positive and negative voters per thread for all threads in a corpus of threads, such as the thread store 106. In one specific example, K and L may be taken to be 10 to represent an average of ten positive voters and ten negative voters on each thread. A voter is said to be a positive voter if the average of all of the user's votes for posts of a thread is positive, and a voter is said to be a negative voter if the average of all of the user's posts of a thread is negative. A positive vote is assigned a value of 1 and a negative vote is assigned a value of 0. i represents the set of unique voting users that have voted positively or negatively for a post in the respective discussion thread. o_i is a value between 0 and 1 and represents an average of votes of a unique voting user for all posts in the respective discussion thread. w_i=0.5T/H, where T is an age of the unique voting user's last vote and H is a half-life in units of time (e.g., seconds, minutes, hours, days, months, years, etc.).

The foregoing example provides a weighted Bayesian average of all votes for each discussion thread 118, weighted by decaying it over time. This approach ensures that a customer cannot stack the voting by voting on all posts, for example. Also, a thread that has one or a small number of very popular posts at or near the beginning is likely to be rated highly (as it should be), since every separate vote on that popular post adds one positive vote to the thread. In contrast, a thread that is contentious, where some posts are voted positively and others are voted negatively, will have a mediocre average vote score that will allow less contentious posts to bubble up above them. Additionally, threads that are no longer getting votes will decay to the mean (0.5), letting currently popular threads overtake them.

In another specific example corresponding to the stickiness ranking strategy 148, discussion threads may be ranked based at least in part on a number of unique participants in the respective discussion thread, a number of users that have subscribed to the respective discussion thread, a number of positive and/or negative votes associated with posts of the respective discussion thread, and a time since a last positive vote for a post of the respective discussion thread. More specifically, under the stickiness ranking strategy 148, discussion threads may be ranked based on the following parameterized equation:

$$\frac{\frac{((C1*S_u)+N1)}{V^{C4}+D1} + \frac{((C2*P_u)+N2)}{V^{C4}+D2} + \frac{((C3*V_t)+N3)}{V^{C4}+D3} + (C7*CQ)}{(A/C5)^{C6}} \quad (2)$$

In the preceding equation, C1-C7 are weight factors chosen based on the importance and/or significance of the respective thread characteristics. N1-N3 and D1-D3 are constants chosen to Normalize the equation to account for outliers and edge cases. In one specific example, C2 may be chosen to be about 5, C1 and C3 may be chosen to be about 1, and C4-C7, D1-D3, and N1-N3 may be chosen to be zero. $S_u$ represents the number of unique subscribers not counting the author of the post. $P_u$ represents the number of unique posters not counting the author of the original post. $V_t$ represents the total number of votes (positive and negative) received for a thread. V represents a total number of views of the thread. A represents an age since the thread was first created in units of time (e.g., hours, days, months, years, etc.). CQ is the same as that in equation 1 above and represents a content quality of each thread.

The foregoing example provides a weighted Bayesian score based on a number of unique participants in the respective discussion thread, a number of users that have subscribed to the respective discussion thread, a number of positive and/or negative votes associated with posts of the respective discussion thread, weighted by decaying it over time. By counting only posts by unique users, this approach will minimize threads with conversations between a small set of enthusiasts (e.g., about topics of interest only to the members of the conversation). This approach also takes into account threads that others have found sufficiently interesting to subscribe to. Also, by decaying the score, the same threads will not stay at the top of the rankings unless they continue to receive votes over time.

In a variation on the foregoing example, the parameterized equation for stickiness may also take into account a number of users that, after viewing a thread title, selected the title to view the individual posts. In that case, the number of selections relative to the total number of views may be an indication of how enticing the thread title is.

Example User Interfaces (UIs)

FIG. 2 is a screen rendering of an example user interface (UI) 200 that includes a discussion forum, such as the one shown in FIG. 1. The discussion forum 200 includes a list of multiple discussion threads 118. In the illustrated example, one of the discussion threads 118(O) is shown in bold italics to indicate that it has been selected by a user. Upon selection by the user, the discussion thread 118(O) is opened and individual posts of the discussion thread 118(O) are presented to the user. While the example UI 200 comprises a web page served by the content provider 106 and rendered by a computing device, such as computing device 104(1), in this example, in other instances the UI 200 may be rendered for local applications or in any other context.

The example UI 200 illustrates several of the characteristics of discussion threads that may be used to rank discussion threads. For example, the UI 200 illustrates that the discussion thread 118(O) includes a subscription indicator 202, which indicates a number of users that have subscribed to the discussion thread 118(O). In this case, fifty-two (52) users have subscribed to the discussion thread. To subscribe to the discussion thread, a user may, for example, select the subscription indicator 202 to open a dialog box to create a subscription.

The discussion thread 118(O) includes a total of twelve (12) posts, three (3) of which are shown in FIG. 2 as elements 132(1), 132(2) and 132(3) (collectively 132). Additional posts can be displayed by selecting the "See More Posts" control in the lower left corner of the page. As discussed briefly with respect to FIG. 1, each of the posts 132 includes statistics 134, indicating a number of positive and negative votes that have been received for the respective post. As discussed above, positive votes may indicate that a voting user generally agreed with the post or thought that the post added value to the discussion thread, while negative votes may indicate that a user generally disagreed with the post or found the post to add no real value to the discussion thread. In some examples, votes may be used as explicit indicators of whether users found a particular post to be helpful. The statistics 134, or more specifically the votes underlying the statistics, are one factor that may be used to rank discussion threads for presentation in a discussion forum. In the event that the votes represent a helpfulness of the posts, when applying a helpfulness ranking strategy, the positive votes for posts of a thread may be used as a primary measure of the helpfulness of a thread.

FIG. 2 also illustrates an example of an explicit indication of helpfulness in the text of a subsequent post. Specifically, the third post 132(3) includes an explicit indication of helpfulness 204 ("Die Hard Gamer, thanks for the comment, that was very helpful"), referring to a statement made in the second post 132(2). The discussion forum module 140 or other component of the content provider 106 may recognize this sort of explicit indication of helpfulness by analyzing the text of posts for terms such as "helpful," "great post," "thanks," "informative," and other terms that indicate the beneficial nature of a post. The text analysis may further be used to identify a post to which the explicit feedback applies by, for example, looking at text surrounding the identified term of helpfulness to identify a subject to which it applies (in this case a previous post by Die Hard Gamer).

A timing of the posts 132 of thread 118(O) can also be analyzed to determine a frequency of posts to the respective discussion thread. A higher frequency of posts may, for example, be an indication of high stickiness, particularly when the posts are provided by multiple unique users.

The discussion forum module 140 may also examine an amount of time that each thread, or each post of the thread, are viewed, a number of threads that after being viewed are selected (e.g., clicked on), and/or a behavior of users after having viewed and/or selected a thread. For example, if after viewing a particular thread, users often purchase an item mentioned in the thread, the thread may be determined to have a high helpfulness ranking.

FIG. 3 is another example UI 300, which illustrates additional characteristics that may be used to rank discussion threads according to various ranking strategies. In FIG. 3, text of the various posts may be analyzed for comparison to other previous posts. For example, the discussion forum module 140 or another component of the content provider 106 may determine that a discussion thread is likely to be helpful to a broad range of users based on a comparison of text of the respective discussion thread to text of other discussion threads previously determined to be helpful. Likewise, a discussion thread may be found to be likely to be sticky based on a comparison of text of the respective discussion thread to text of other discussion threads previously determined to be sticky. In the illustrated example, the text "XYZ game console is still better than ABC game console" was found to be similar to text in three other posts, shown collectively as 302, which were determined to have the respective similarity scores 304, helpfulness scores 306, and stickiness scores 308 shown.

As another example, the discussion forum module 140 or another component of the content provider 106 may determine that a discussion thread is likely to be helpful to a broad range of users based on a comparison of text of the respective discussion thread to text of other discussion threads previously determined to elicit positive votes. In the illustrated example, the text "XYZ game console is still better than ABC game console" was found to be similar to text in three other posts, shown collectively as 310, which were determined to have the respective similarity scores 312 and percentages of positive votes 314 shown. The similarity score for each thread relates to a number of words the respective discussion thread shares with titles and/or posts of other discussion threads.

FIG. 4 is another example UI 400, which illustrates additional characteristics that may be used to rank discussion threads according to various ranking strategies. In the example of FIG. 4, discussion threads are shown ranked at least in part on their relation to one or more topics of current interest or "Hot Topics." As shown in FIG. 4, the discussion thread 118(O) relates to three hot topics, a micro-blog post 402 related to the ABC gaming console, a recent news article 404 from Gamer News magazine related to the ABC game console, and a recent really simple syndication (RSS) feed post 406 related to the ABC game console. The discussion forum module 140 or another component of the content provider 106 may crawl the web to identify hot topics from other media sources, may subscribe to feeds from one or more other media sources, and/or may query a search engine or other intermediary service to obtain information regarding hot topics.

Figure 5:
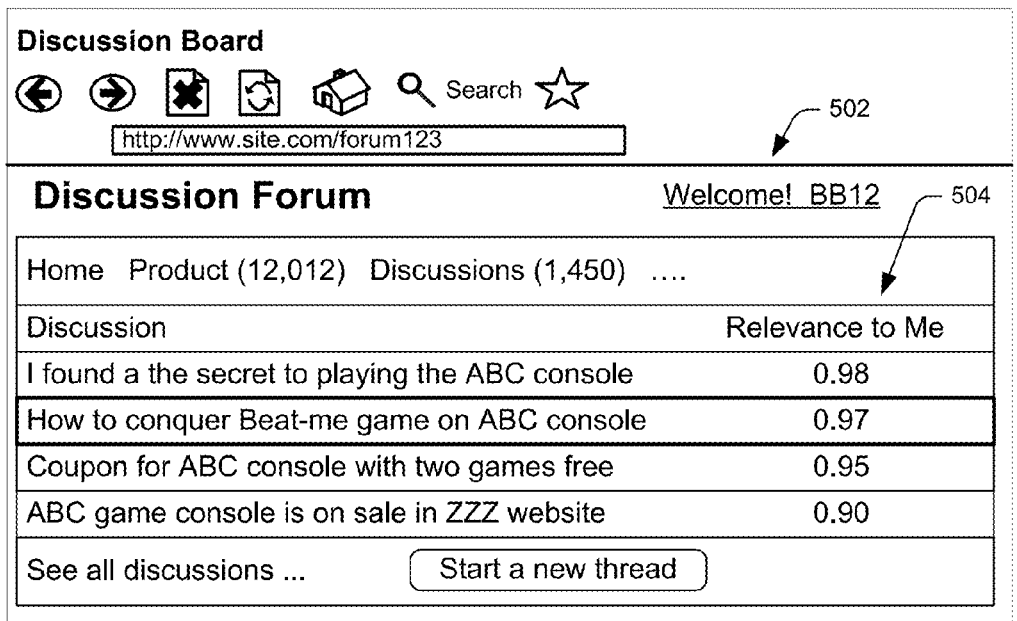
FIG. 5 is a screen rendering of another example UI, which illustrates discussion threads ranked based on relevance to a specific user.

FIG. 5 is yet another example UI 500, which illustrates additional characteristics that may be used to rank discussion threads. In this example, the user ID module 142 or other component of content provider 106 may identify a user that is viewing the discussion forum. The user's identification may be determined by asking the user to log into the system using a user name and password, or using another authentication credential (e.g., certificate, token, etc.). Additionally or alternatively, the user's identification may be determined based on one or more files exchanged between the user's computing device (e.g., computing device 104(1)) and the content provider 106, such as a cookie. In the illustrated example, the user (user BB12) is logged-in, as shown by the welcome banner 502 on the UI 500.

The discussion forum module 140 may then select a parameterized equation to use to rank the discussion threads based at least in part on an explicit selection of a thread ranking strategy by the user. For example, the user may be given the option to set a binary thread ranking strategy (e.g., helpful, sticky, other), or may be allowed to choose a hybrid strategy (e.g., surface 70% helpful threads and 30% sticky threads). Alternatively, a parameterized equation to use to rank the discussion threads may be selected based at least in part on an implicit selection of a thread ranking strategy. An implicit selection may be inferred based, for example, on a history of the user's interaction with the discussion forum, previous explicit settings by a user, a purchase history of the user (from an entity/site hosting the discussion forum and/or other entities/sites), or the like. As another example, the implicit selection of a ranking strategy may be inferred based on a user's previous purchase history with respect to a particular item or category of items. For instance, a user that has a history of purchasing audio CDs, when viewing an item detail page for an audio CD may be presented with a discussion forum with threads ranked according to a helpful ranking strategy. However, when viewing an item detail page for electronics, the same user may be presented with a discussion forum with threads ranked according to a sticky ranking strategy if the user has a history of commenting on electronics forums without purchasing electronics. Once the thread ranking strategy is selected, the threads may be served by the discussion forum module 140 for presentation to the user based on the relevance to the user, as indicated by the "Relevance to Me" scores 504 shown in the UI 500.

Example Thread Ranking Processes

Figure 6:
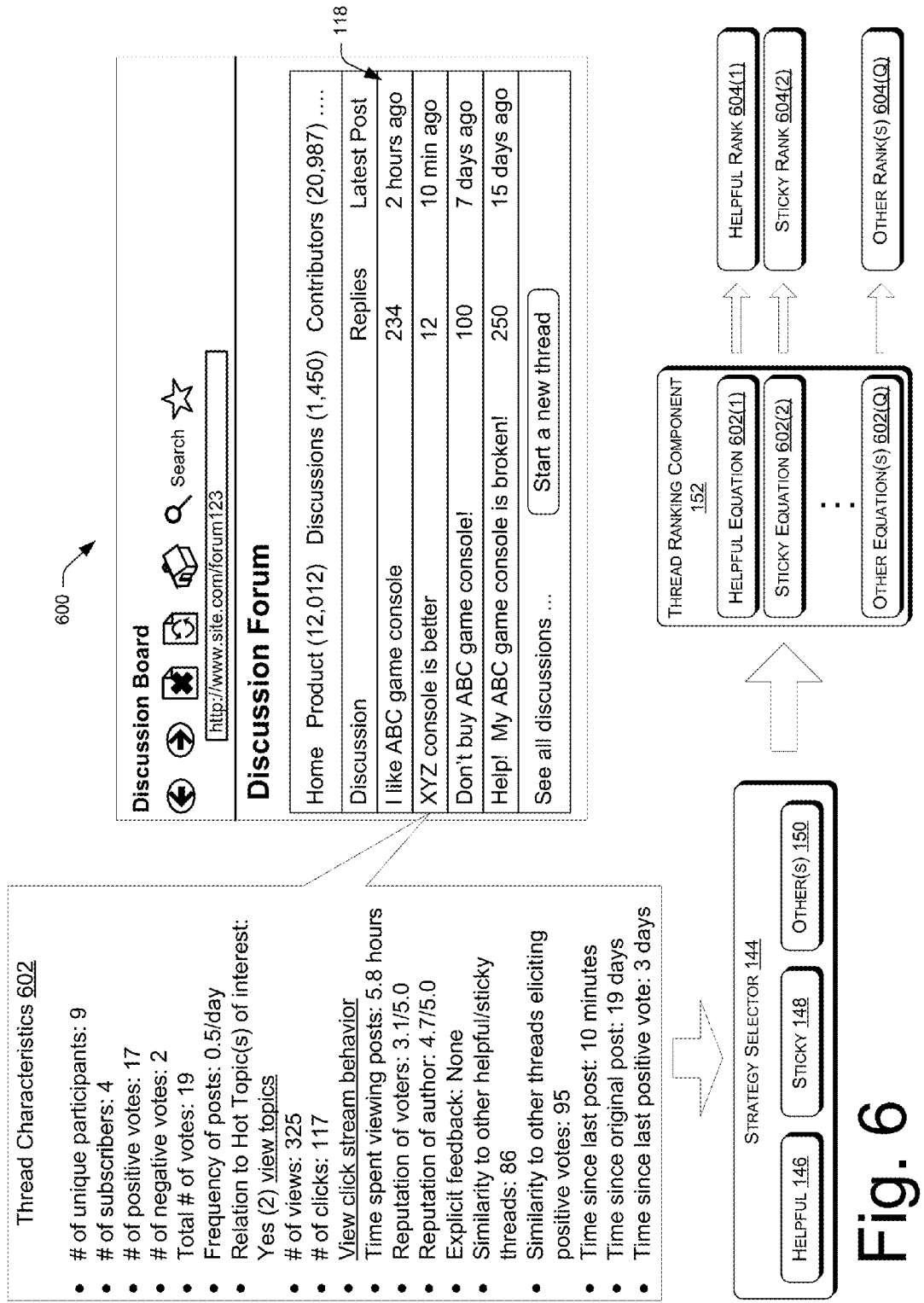
FIG. 6 is a schematic diagram, which illustrates selection of a thread ranking strategy and subsequent ranking of discussion threads using a parameterized equation corresponding to the selected thread ranking strategy.

FIG. 6 is a schematic diagram and schematically illustrates an overview of a process 600 of selecting a thread ranking strategy and ranking threads according to one or more thread ranking equations. FIG. 6 illustrates yet another example UI 600 presenting a discussion post including a plurality of discussion threads 118. Each of the discussion threads 118 has a number of characteristics 602, some of which are visible on the UI 600 (e.g., time since last post), and others of which are not (e.g., number of views, number of clicks, etc.). The characteristics 602 shown in FIG. 6 are merely examples, and other characteristics may also be used. Any or all of the characteristics 602 may be used as a basis to rank threads according to one or more thread ranking strategies. The values of the characteristics 602 shown in FIG. 6 correspond to the example thread "XYZ console is better" shown in the listing of threads in the discussion forum of FIGS. 1, 2, 4, and 6.

Strategy selector 144 determines a strategy to employ to rank the discussion threads 118. In the illustrated example, strategy selector 138 can select from among a helpful strategy 146 (in which threads are ranked based on their likelihood of being helpful to a broad range of consumers), a sticky strategy 148 (in which threads are ranked according to their likelihood of enticing users to participate in the discussion thread), and one or more other strategies 150. The thread ranking component 152 then ranks the threads using a parameterized equation corresponding to the selected ranking strategy chosen from among a helpful equation 602(1), a sticky equation 602(2), and one or more other equations 602(Q). Output of the thread ranking component 152 is, for each thread a helpful rank 604(1) if the helpful equation 602(1) was employed, a sticky rank 604(2) if the sticky equation 602(2) was employed, or one or more other ranks 604(Q) if an other equation 602(Q) was employed. In some embodiments, threads may be ranked according to multiple different ranking schemes (and hence equations) simultaneously or sequentially for presentation in different discussion forums and/or in different rank orders. In that case, users may be given the option to sort discussion threads based on one or more different ranking strategies (e.g., by selecting the desired ranking strategy from a drop down menu).

Figure 7:
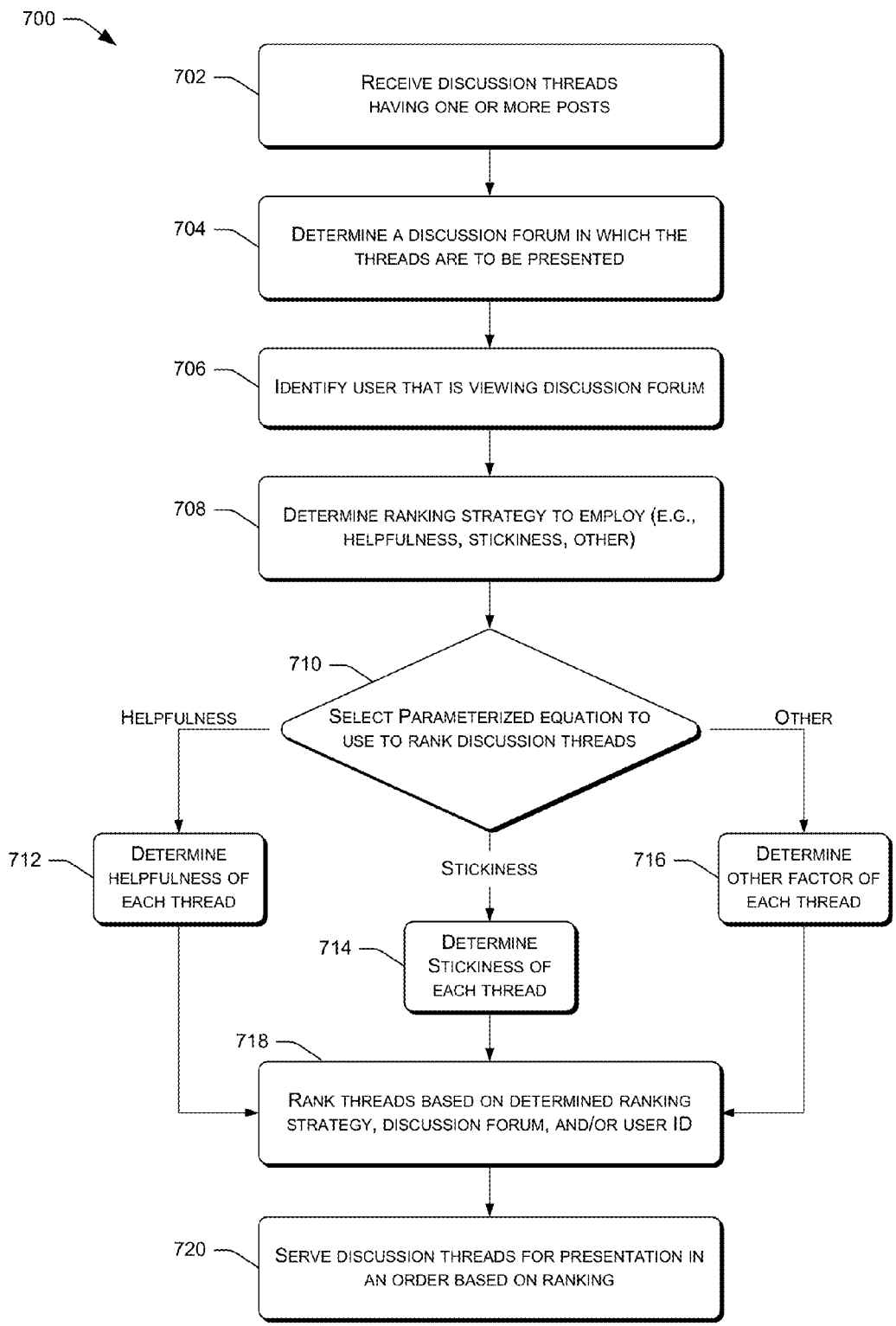
FIG. 7 is a flow diagram of an example process of ranking discussion threads based on a factor other than a time since a last post of each thread. In the illustrated example, threads may be ranked based on a helpfulness of the discussion threads, a stickiness of the discussion threads, and/or another ranking strategy.

FIG. 7 is a flow diagram of an example process 700 of surfacing discussion threads based on a factor other than a time since a last post of each discussion thread. The process is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the process may be omitted entirely.

The process 700 includes, at operation 702, receiving one or more discussion threads, each having one or more posts. The discussion threads may be received by the discussion forum module 140 from another component of the content provider 106 and/or from one or more user computing devices 104. At 704, the process 700 continues by determining a discussion forum in which the threads are to be presented. For instance, discussion forum module 140 may determine one or more forums to which each discussion thread belongs based on, for example, a forum in which the discussion thread was created, a forum to which a post of the discussion thread relates, or the like. In some examples, threads may be configured to be presented in multiple different discussion forums.

In some embodiments, an operation 706 then identifies a user that is viewing a particular forum in which the threads are to be presented. For example, the user ID module 142 may identify a user based on a login credential, such as a username and password. However, in other embodiments, the process 700 may omit the operation of determining the identity of the user.

An operation 708 includes determining a ranking strategy to use to rank the discussion threads from among a helpfulness strategy, a stickiness strategy, and one or more other strategies. Then, based on the ranking strategy chosen, an operation 710 includes selecting a parameterized equation corresponding to the chosen ranking strategy to use to rank the discussion threads. If the helpfulness equation was selected in operation 710, then at operation 712 a helpfulness of each thread is determined. If the stickiness equation was selected at operation 710, then at operation 714 a stickiness of each thread is determined. If another equation was selected at operation 710, then at operation 716, the other factor of each thread is determined. In one example, the strategy selector 144 may implement operations 708, 710, 712, 714, and 716. Alternatively, in some embodiments, the thread ranking component 146 may implement operations 712, 714, and 716.

The process 700 then proceeds, at operation 718, to rank the threads according to the determined ranking strategy, the discussion forums in which the threads are to be presented, and/or the user determined to be viewing the discussion forum. For instance, thread ranking component 146 may rank the threads according to the thread ranking strategy selected by the strategy selector 144. Then, operation 720 serves the threads for presentation in a discussion forum in an order based on the ranking. For instance, thread serving component 152 may serve the threads for display by application 126 on a display of a client computing device 104. Alternatively, in some embodiments, operation 720 may include causing the threads to be displayed at a display of the content provider 106.

Example Title and Relevant Post Determination Processes

FIG. 8 is a screen rendering of another example UI 800, which illustrates determination and presentation of a title and a most relevant post of a discussion thread in a discussion forum. FIG. 8 illustrates a discussion thread having three posts 132. In one example, in addition to or instead of ranking the threads based on a ranking strategy as discussed above, a most relevant post, reply, or post/reply combination in a thread may be surfaced along with a title of the thread, as shown by thread 118(O) in this figure.

The most relevant post, reply, or post/reply combination may be determined using a parameterized equation using one or more thread characteristics, such as thread characteristics 602 in FIG. 6. For instance, the most relevant post may be determined based at least in part on a number of positive votes for each post of the respective discussion thread, a number of unique voters for each post of the respective discussion thread (vote diversity), and/or a position of the post within the discussion thread. In one specific example, the most relevant post, reply, or post/reply combination may be determined using following equation:

$$R = (X1 + S1 \cdot V_p) / (X2 + S1 \cdot V_t) \quad (3)$$

In the preceding equation, R is the relevance of the respective post or reply. X1 and X2 are unitless constants chosen to represent an average number positive and total votes per post in a corpus of threads, such as the thread store 106. S1 is a scaling factor, which is a function of a position of the post or reply in the thread. The position of the post or reply in the thread may be in terms of distance between the post and the original post in the thread and/or the number of intervening replies in a chain of replies to the original post. In one example, S1 may be equal to 1/position in the thread. $V_p$ represents the number of positive votes for the post, and $V_t$ represents the total number of votes (positive and negative) for the post. In some embodiments, a weight associated with the first post (e.g., the question) may be scaled down, in order to capture the best answer/reply in the thread. The foregoing strategy may also be employed to choose the best title for a thread from among posts that best articulate the gist of the thread.

In the example of FIG. 8, the second post is found to be the most relevant post based on the current ratio of positive to negative votes and based on the position of the post in the thread. Therefore, the second post is surfaced along with the title of the thread at 118(O). Also, text from the third post is determined to be most representative of the posts of the discussion thread and is therefore used as the title of thread 118(O). The title may comprise a summary of a post of the thread and/or a snippet of text from a post of the thread that best captures the sentiment or gist of the thread. Topic sentence identification techniques may be use to identify topic sentences of posts, which may then be compared to other posts in the thread to determine the sentiment or gist of the thread. In the illustrated example, the text used for the title is not a direct quote from the third post. Rather, certain words may be dropped to shorten the title and/or remove unneeded words, such as the word "still" in this example.

Figure 9:
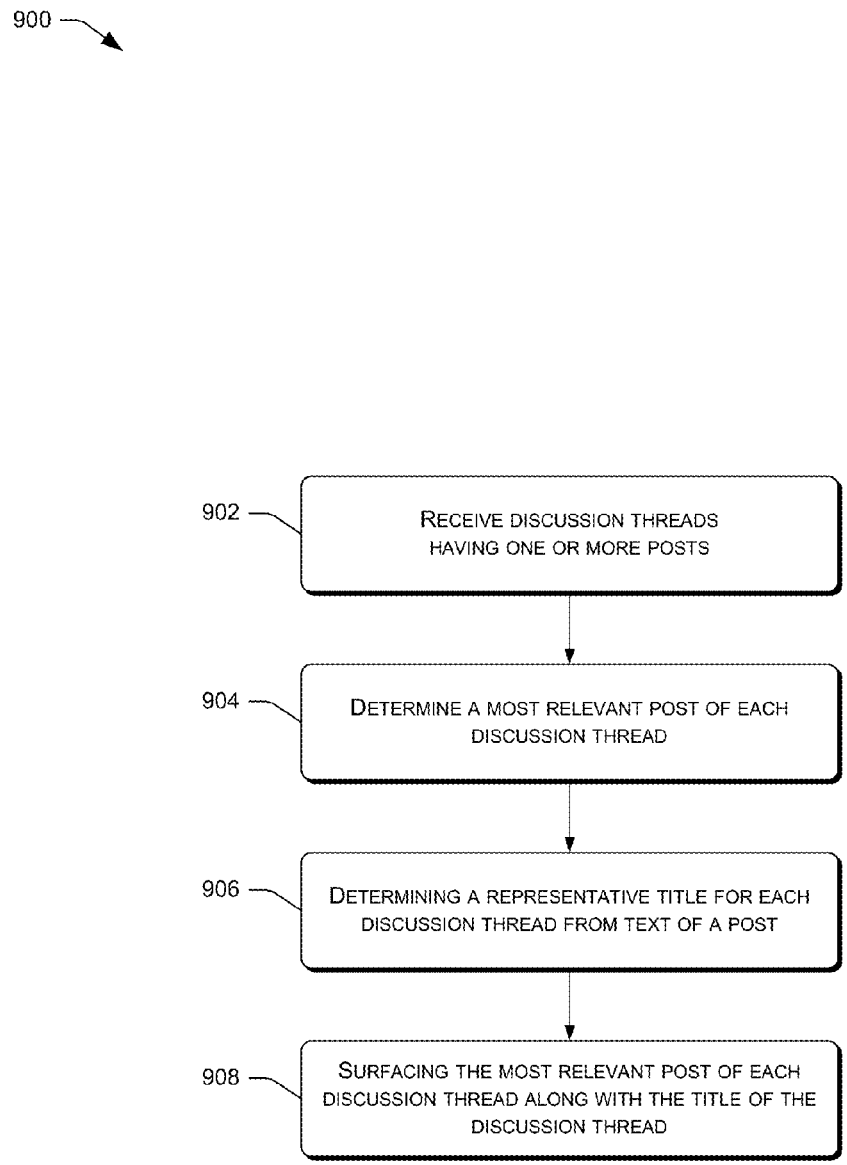
FIG. 9 is a flow diagram of an example process of determining a title and a most relevant post of a discussion thread for presentation in a discussion forum.

FIG. 9 is a flow diagram of an example process 900 of determining a title and a most relevant post of a discussion thread for presentation in a discussion forum. Like process 700, process 900 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some embodiments, one or more blocks of the process may be omitted entirely.

The process 900 includes, at operation 902, receiving discussion threads having one or more posts. The process continues at operation 904 by determining a most relevant post of each discussion thread using, for example, the parameterized equation described above with reference to FIG. 8. Next, operation 906 includes determining a representative title for each discussion thread from text of a post of the thread using the same or different parameterized equation. Finally, operation 908 includes surfacing the most relevant post of one or more of the discussion threads along with the title of the respective discussion thread in a discussion forum. The operations of process 900 may be performed partly or entirely by the discussion forum module 140. In some embodiments, operation 906 may be omitted and the thread title may be chosen to be the original title given the thread by a creator of the thread. Also, as noted above, the process 900 may be performed independently or in combination with the example thread ranking process 700.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed by one or more processors, configure the one or more processors to perform acts comprising:

receiving multiple discussion threads that are to be presented in a discussion forum relating to an item or an item category, individual discussion threads of the multiple discussion threads having one or more posts;

identifying a user that is viewing the discussion forum during a session on a site;

determining a thread ranking strategy among multiple different thread ranking strategies, the multiple different thread ranking strategies comprising: (i) a first thread ranking strategy that ranks the multiple discussion threads based at least in part on a likelihood that the user or a range of users will vote positively for the individual discussion threads; and (ii) a second thread ranking strategy that ranks the multiple discussion threads based at least in part on a likelihood that the user or the range of users will participate in the individual discussion threads, the thread ranking strategy being determined based at least in part on at least one of a purchase history of the user indicating past purchases by the user of the item or items within the item category, or an interaction history of the user with the discussion forum during one or more previous sessions on the site;

generating a ranking of the multiple discussion threads based at least in part on a parameterized equation corresponding to the thread ranking strategy; and serving the multiple discussion threads for presentation on a computing device of the user during the session in an order based at least in part on the ranking.

2. The one or more non-transitory computer-readable media of claim 1, wherein the thread ranking strategy comprises the first thread ranking strategy, the acts further comprising determining the likelihood that the user or the range of users will vote positively for the individual discussion threads based at least in part on at least one of:

a number of users that have voted positively for at least one post of the multiple discussion threads;

an amount of time users spent viewing a post of the multiple discussion threads;

a reputation of a voter who has voted on at least one post of the multiple discussion threads;

a reputation of an author of a post of the multiple discussion threads;

a number of times that a post of the multiple discussion threads has been viewed;

a number of times that a post of the multiple discussion threads has been clicked-through;

a behavior of users after viewing or clicking-through a post of the multiple discussion threads;

explicit feedback from users regarding helpfulness of a post of the multiple discussion threads;

a comparison of text of a discussion thread of the multiple discussion threads to text of another discussion thread of the multiple discussion threads previously determined to elicit positive votes; or a comparison of text of a discussion thread of the multiple discussion threads to text of another discussion thread of the multiple discussion threads previously determined to be helpful.

3. A method comprising:

under control of one or more processors configured with executable instructions, receiving multiple discussion threads that are to be presented in a discussion forum relating to an item or an item category, individual discussion threads of the multiple discussion threads having one or more posts;

identifying a user that is interacting with the discussion forum during a session;

determining a thread ranking strategy among multiple different thread ranking strategies, the multiple different thread ranking strategies comprising: (i) a first thread ranking strategy that ranks the multiple discussion threads based at least in part on a likelihood that the user or a range of users will vote positively for the individual discussion threads; and (ii) a second thread ranking strategy that ranks the multiple discussion threads based at least in part on a likelihood that the user or the range of users will participate in the individual discussion threads, the thread ranking strategy being determined based at least in part on at least one of a purchase history associated with the user and with the item or items within the item category, or an interaction history of the user with the discussion forum during one or more previous sessions;

generating a ranking of the multiple discussion threads based at least in part on a parameterized equation corresponding to the thread ranking strategy; and serving the multiple discussion threads for presentation on a computing device of the user in an order based at least in part on the ranking.

4. The method of claim 3, wherein the thread ranking strategy comprises the first thread ranking strategy.

5. The method of claim 4, further comprising determining the likelihood that the user or the range of users will vote positively for the individual discussion threads based at least in part on a number of users that have subscribed to one or more of the multiple discussion threads.

6. The method of claim 4, further comprising determining the likelihood that the user or the range of users will vote positively for the individual discussion threads based at least in part on an amount of time users spent viewing a post of the multiple discussion threads.

7. The method of claim 4, further comprising determining the likelihood that the user or the range of users will vote positively for the individual discussion threads based at least in part on a reputation of a voter who has voted on a post of the multiple discussion threads.

8. The method of claim 4, further comprising determining the likelihood that the user or the range of users will vote positively for the individual discussion threads based at least in part on a reputation of an author of a post of the multiple discussion threads.

9. The method of claim 4, further comprising determining the likelihood that the user or the range of users will vote positively for the individual discussion threads based at least in part on a number of times that a post of the multiple discussion threads has been viewed.

10. The method of claim 4, further comprising determining the likelihood that the user or the range of users will vote positively for the individual discussion threads based at least in part on a number of times that a post of the multiple discussion threads has been clicked-through.

11. The method of claim 4, further comprising determining the likelihood that the user or the range of users will vote positively for the individual discussion threads based at least in part on a behavior of users after viewing or clicking-through a post of the multiple discussion threads.

12. The method of claim 4, further comprising determining the likelihood that the user or the range of users will vote positively for the individual discussion threads based at least in part on explicit feedback from users regarding helpfulness of a post of the multiple discussion threads.

13. The method of claim 4, further comprising determining the likelihood that the user or the range of users will vote positively for the individual discussion threads based at least in part on a comparison of text of a discussion thread of the multiple discussion threads to text of another discussion thread of the multiple discussion threads previously determined to elicit positive votes.

14. The method of claim 4, further comprising determining the likelihood that the user or the range of users will vote positively for the individual discussion threads based at least in part on a comparison of text of a discussion thread of the multiple discussion threads to text of another discussion thread of the multiple discussion threads previously determined to be helpful.

15. The method of claim 3, further comprising decaying a rank of a discussion thread of the multiple discussion threads over time based at least in part on a time since an original post was made for the discussion thread.

16. The method of claim 3, further comprising decaying a rank of a discussion thread of the multiple discussion threads over time based at least in part on a time since a last positive vote for a post of the discussion thread.

17. The method of claim 3, wherein the thread ranking strategy comprises the first thread ranking strategy, and wherein the parameterized equation calculates the likelihood that the user or the range of users will vote positively for the individual discussion threads as a function of an average number of positive and negative voters on one or more of the multiple discussion threads, a set of unique voting users that have voted positively or negatively for a post in a respective discussion thread of the multiple discussion threads, an average of votes of a unique voting user for all posts in the respective discussion thread, and an age of a last vote of the unique voting user.

18. The method of claim 3, further comprising:
determining a most relevant post of a discussion thread of the multiple discussion threads; and
surfacing the most relevant post of the discussion thread along with a title of the discussion thread.

19. The method of claim 18, wherein determining the most relevant post of the discussion thread is based at least in part on at least one of a number of positive votes for individual posts of the discussion thread, a number of unique voters for individual posts of the discussion thread, or a position of the most relevant post within the discussion thread.

20. The one or more non-transitory computer-readable media of claim 1, the acts further comprising decaying a rank of a discussion thread of the multiple discussion threads over time based at least in part on a time since an original post was made for the discussion thread.

21. The one or more non-transitory computer-readable media of claim 1, the acts further comprising decaying a rank of a discussion thread of the multiple discussion threads over time based at least in part on a time since a last positive vote for a post of the discussion thread.

22. The method of claim 3, further comprising decaying a rank of a discussion thread of the multiple discussion threads over time based at least in part on a time since receipt of a vote for a post of the discussion thread.

23. A system comprising:
one or more processors; and
memory storing computer-executable instructions that, when executed by the processor, perform operations comprising:
receiving multiple discussion threads that are to be presented in a discussion forum relating to an item or an item category, individual discussion threads of the multiple discussion threads having one or more posts;
identifying a user that is interacting with the discussion forum during a session;
determining a thread ranking strategy among multiple different thread ranking strategies, the multiple different thread ranking strategies comprising: (i) a first thread ranking strategy that ranks the multiple discussion threads based at least in part on a likelihood that the user or a range of users will vote positively for the individual discussion threads; and (ii) a second thread ranking strategy that ranks the multiple discussion threads based at least in part on a likelihood that the user or the range of users will participate in the individual discussion threads, the thread ranking strategy being determined based at least in part on at least one of a purchase history associated with the user and with the item or items within the item category, or an interaction history of the user with the discussion forum during one or more previous sessions;
generating a ranking of the multiple discussion threads based at least in part on a parameterized equation corresponding to the thread ranking strategy; and
serving the multiple discussion threads for presentation on a computing device of the user in an order based at least in part on the ranking.

24. The system of claim 23, wherein the multiple discussion threads comprise multiple first discussion threads, the discussion forum comprises a first discussion forum, the item comprises a first item, the item category comprises a first item category, the one or more posts comprise one or more first posts, the thread ranking strategy comprises the first thread ranking strategy, the purchase history comprises a first purchase history, the interaction history comprises a first interaction history, the ranking comprises a first ranking, and the parameterized equation comprises a first parameterized equation, the operations further comprising:
receiving multiple second discussion threads that are to be presented in a second discussion forum relating to a second item or a second item category, individual discussion threads of the multiple second discussion threads having one or more second posts;
determining that the user is interacting with the second discussion forum during the session or subsequent session;
determining the second thread ranking strategy for ranking the multiple second discussion threads during the session or the subsequent session, the second thread ranking strategy being different from the first thread ranking strategy and determined based at least in part on at least one of a second purchase history associated with the user and with the second item or items within the second item category, or a second interaction history of the user with the second discussion forum during one or more of the one or more previous sessions;
generating a second ranking of the multiple second discussion threads based at least in part on a second parameterized equation corresponding to the second thread ranking strategy; and
serving the multiple second discussion threads for presentation on the computing device of the user in an order based at least in part on the second ranking.

25. The system of claim 23, wherein the user comprises a first user, the session comprises a first session, the one or more previous sessions are associated with the first user, the computing device comprises a first computing device, the thread ranking strategy comprises the first thread ranking strategy, the purchase history comprises a first purchase history, the interaction history comprises a first interaction history, the ranking comprises a first ranking, and the parameterized equation comprises a first parameterized equation, the operations further comprising:
  identifying a second user that is interacting with the discussion forum during a second session;
  determining the second thread ranking strategy for ranking the multiple discussion threads during the second session, the second thread ranking strategy being different from the first thread ranking strategy and determined based at least in part on at least one of a second purchase history associated with the second user and with the item or items within the item category, or a second interaction history of the second user with the discussion forum during one or more previous sessions associated with the second user;
  generating a second ranking of the multiple discussion threads based at least in part on a second parameterized equation corresponding to the second thread ranking strategy; and
  serving the multiple discussion threads for presentation on a second computing device of the second user in an order based at least in part on the second ranking.

26. The system of claim 23, wherein the thread ranking strategy comprises the first thread ranking strategy, and wherein the parameterized equation calculates the likelihood that the user or the range of users will vote positively for the individual discussion threads as a function of an average number of positive and negative voters on one or more of the multiple discussion threads, a set of unique voting users that have voted positively or negatively for a post in a respective discussion thread of the multiple discussion threads, an average of votes of a unique voting user for all posts in the respective discussion thread, and an age of a last vote of the unique voting user.

* * * * *